US008393457B2

(12) United States Patent
Illedits et al.

(10) Patent No.: US 8,393,457 B2
(45) Date of Patent: Mar. 12, 2013

(54) HANDRAIL FOR AN ESCALATOR OR A MOVING WALKWAY

(75) Inventors: Thomas Illedits, Neufeld (AT); Thomas Novacek, Schwechat (AT); Michael Matheisl, Österreich (AT)

(73) Assignee: Inventio AG, Hergiswil NW (CH)

( * ) Notice: Subject to any disclaimer, the term of this patent is extended or adjusted under 35 U.S.C. 154(b) by 150 days.

(21) Appl. No.: 12/993,543

(22) PCT Filed: May 5, 2009

(86) PCT No.: PCT/EP2009/055429
§ 371 (c)(1), (2), (4) Date: Nov. 19, 2010

(87) PCT Pub. No.: WO2009/141225
PCT Pub. Date: Nov. 26, 2009

(65) Prior Publication Data

US 2011/0061990 A1 Mar. 17, 2011

(30) Foreign Application Priority Data

May 21, 2008 (EP) .................................... 08156619

(51) Int. Cl.
*B65G 15/00* (2006.01)

(52) U.S. Cl. ....................................................... 198/335

(58) Field of Classification Search .......... 198/335–337; 362/146
See application file for complete search history.

(56) References Cited

U.S. PATENT DOCUMENTS

| | | | | |
|---|---|---|---|---|
| 4,896,759 | A * | 1/1990 | Badstuebner et al. | 198/324 |
| 5,099,402 | A * | 3/1992 | Starniri | 362/146 |
| 5,268,828 | A * | 12/1993 | Miura | 362/249.06 |
| 5,366,061 | A * | 11/1994 | Kruse et al. | 198/335 |
| 5,450,299 | A * | 9/1995 | Lepre | 362/145 |
| 6,129,442 | A * | 10/2000 | Hoefling et al. | 362/146 |
| 6,425,676 | B1 * | 7/2002 | Lyons | 362/152 |
| 6,866,125 | B2 * | 3/2005 | Ball et al. | 187/391 |
| 7,108,393 | B2 * | 9/2006 | Kleewein et al. | 362/146 |
| 7,331,686 | B2 * | 2/2008 | Ossevoort et al. | 362/145 |
| 8,123,373 | B2 * | 2/2012 | Vogt et al. | 362/146 |

* cited by examiner

*Primary Examiner* — Douglas Hess
(74) *Attorney, Agent, or Firm* — Ladas & Parry LLP

(57) ABSTRACT

A handrail, used in particular for escalators or moving walkways, has a plurality of individual grip elements arranged in a series along the length of the handrail loop. Each grip element has an oval or elliptical outer shell, cover layer or casing that is at least partially transparent. An illumination unit is situated in the interior the shell, cover layer or casing.

15 Claims, 2 Drawing Sheets

HANDRAIL FOR AN ESCALATOR OR A MOVING WALKWAY

The invention relates to a handrail, particularly to a handrail for escalators or moving walkways. Specifically, the invention relates to the field of handrails for escalators or moving walkways in which the handrail is driven by means of a chain or a belt or the like.

BACKGROUND OF THE INVENTION

An endless handrail with a lighting system is known from U.S. Pat. No. 6,866,125 B2. In that case a plurality of charging stations is provided. The charging stations serve for charging a rechargeable battery, which supplies diodes or other light sources with energy. Charging of the rechargeable battery is then carried out by electromagnetic coupling or supply.

The handrail known from U.S. Pat. No. 6,866,125 B2 has the disadvantage that the design, particularly with respect to the charging stations operating by electromagnetic coupling or supply, is expensive and due to transmission losses and intermediate storage in the rechargeable battery there is low energy yield and light intensity. Moreover, the integration of the required components in the handrail is very complicated and costly.

It is the object of the invention to create handrail in which one or more lighting devices can be operated with (comparatively) low costs.

Specifically, it is an object of the invention to create a handrail with a lighting possibility which is produced economically and is usable as universally as possible.

BRIEF DESCRIPTION OF THE INVENTION

It is advantageous that the outer shell or cover layer or casing of the base body of the grip element or grip segment has a window element which is associated with the lighting means and that the window element is positioned at least laterally at the base body. For example, the window element can be oriented towards the side or also towards the inner side of the escalator or the moving walkway, so that the lighting effect can be better perceived by a user. Moreover, through the lateral arrangement it is possible to achieve illumination which can replace conventional balustrade illumination.

In that case it is additionally advantageous if the outer shell or cover layer or casing has a cross-section which in a grip region is composed of a small oval or elliptical contour and a large oval or elliptical contour, wherein the small oval or elliptical contour is cut at a side of the large oval elliptical contour by the large oval or elliptical contour and wherein the window element in terms of construction or possibility is provided at the large oval or elliptical contour and/or at the small oval or elliptical contour in a region of the cutting. This design of the grip elements of the base body enables different grip positions or handgrip possibilities, wherein gripping from below is also made possible. Children and young people can thereby securely and better hold the handrail. The arrangement of the window element enables good visibility of the lighting means and/or advantageous illumination. In that case, essential parts for the lighting means as well as optionally the lighting means itself can be accommodated in the base body in the region of the large oval or elliptical contour.

In advantageous manner a solar element electrically connected with the lighting means is provided in the interior space of the base body. In that case the solar element can be directly connected with the lighting means. The energy for operation of the lighting means can then be obtained from the environment, particularly from the already-present interior space illumination, or it can be obtained from sunlight. The solar element is preferably disposed with respect to the escalator or the moving walkway at the outside or on the outer side, whilst the lighting means is preferably disposed internally or on the inner side of the escalator or the moving walkway. One or more light-emitting diodes, one or more organic light-emitting diodes, one or more electroluminescent films and/or one or more light-emitting nanodiodes and/or one or more small lamps or lamps or fluorescent tubes is or are preferably used as lighting means.

It is advantageous if at least one traction means contact element is provided and if the traction means contact element is electrically connected with the lighting means.

Moreover, one or more traction means contact elements serve for electrical conducting or contact-making of the traction means. The traction means is preferably formed at least partly from an electrically conductive material or has an electrical conductor mounted at the traction means. For example, the traction means can be formed by a metallic chain or by an embedded steel cable in a belt. The traction means contact element can be designed or constructed as a wiper element, particularly as a mechanical and/or resilient wiper element, as a conductive roller, particularly as a resiliently suspended conductive roller, or the like. An electrical contact or an electrical contact-making of the lighting means with the traction means by way of the traction means contact element is thereby possible.

Moreover, it is advantageous if at least one handrail guide contact element is provided and if a further, opposite handrail guide contact element is electrically connected with the lighting means. Consequently, the handrail guide contact element can also serve for electrical contacting or contact-making of a or the handrail guide and/or a conductor rail connected with the handrail guide. The handrail guide can be designed to be electrically conductive or to conduct low current, for example of aluminium or brass or copper or stainless steel or steel, and be connected with a power supply. Moreover, it is possible for several lighting means of different grip elements to be connected together and/or intermittently connected by way of the handrail guide.

A further handrail guide contact element can in advantageous manner make possible an electrical contact-making or contacting with a further conductor rail, which is mechanically connected oppositely with the handrail guide rail, but electrically insulated therefrom. The current circuit present can thereby be closed. However, a further advantageous embodiment provides a second current circuit which makes possible additional connections or couplings or collective connections.

It is also advantageous if at least one electrical conductor is provided which connects the lighting means of the grip element with one or more further lighting means of other grip elements. The electrical conductor can in that case be designed in advantageous manner as an electrical cable which is led through several lined-up grip elements. Additional switching possibilities are provided by the control cable or cable in order to close the current circuit and to differently activate or switch on the lighting means. It is then also conceivable or possible for two or more electrical conductors to be provided in order to provide intermittent, pulsating, flashing or other forms of lighting up of the lighting means.

It is also advantageous if the lighting means of different grip elements are separately or alternately or alternatively activatable in groups. As a result, on the one hand the lighting intensity and/or the light colour can be controlled. On the other hand, different items of information can be displayed, for example travel direction arrows or other symbols (Stop, Attention, Danger). In that case it is also possible for two or more alternatively or alternately or separately activatable lighting means to be accommodated in a grip element.

In the case of separate activation, each group of lighting means can be activated independently of the other groups. Thus, for example, in the case of two groups of lighting means activation of only the lighting means of the first group, of only the lighting means of the second group or of both the first group and the second group is possible. In an alternative activation, in each instance only one group is activatable. For example, an alternative activation in the case of travel direction arrows is feasible. In this regard the lighting means can be connected with a diode or designed as light-emitting diodes, wherein the polarity of the first group is different from the polarity of the lighting means of the second group.

In the case of an alternating activation it is possible through preselection and/or the switching cycle to light the first light-emitting diode or the second or the third or the fourth, wherein successively five seconds later the next light-emitting diode lights up and the first extinguishes. In continuation, the succeeding light-emitting diode lights up and the second extinguishes, etc. A running light or another, different light effect or a running light effect or a rapid flashing light results.

Reference is expressly made to a possible capability of combining the teaching of this application with the teaching of an application filed at the same time by the same applicant. There, a handrail with material characteristics and safety characteristics improved further or to greater extent or more or multiply improved is disclosed.

BRIEF DESCRIPTION OF THE DRAWINGS

The invention is described in more detail symbolically and by way of example on the basis of figures.

The figures are described conjunctively and generally. The same reference numerals signify the same components and reference numerals with different indices indicate functionally identical or similar components.

Preferred embodiments of the invention are explained in more detail in the following description by way of the accompanying drawings, in which corresponding elements are provided with corresponding reference numerals and in which:

FIG. 1 shows a handrail in a schematic sectional illustration in correspondence with a first embodiment of the invention;

FIG. 2 shows a handrail in a schematic sectional illustration in correspondence with a second embodiment of the invention;

FIG. 3 shows a handrail in a schematic sectional illustration in correspondence with a third embodiment of the invention;

FIG. 4 shows two lined-up grip elements of a handrail, which is illustrated in FIG. 1, from the viewing direction denoted by IV and in correspondence with a further embodiment of the invention; and FIG. 5 shows a schematic switching diagram, in the manner of a detail, for a handrail in correspondence with a further embodiment for additional clarification of the invention.

DETAILED DESCRIPTION OF PREFERRED EMBODIMENTS

Figure 1:
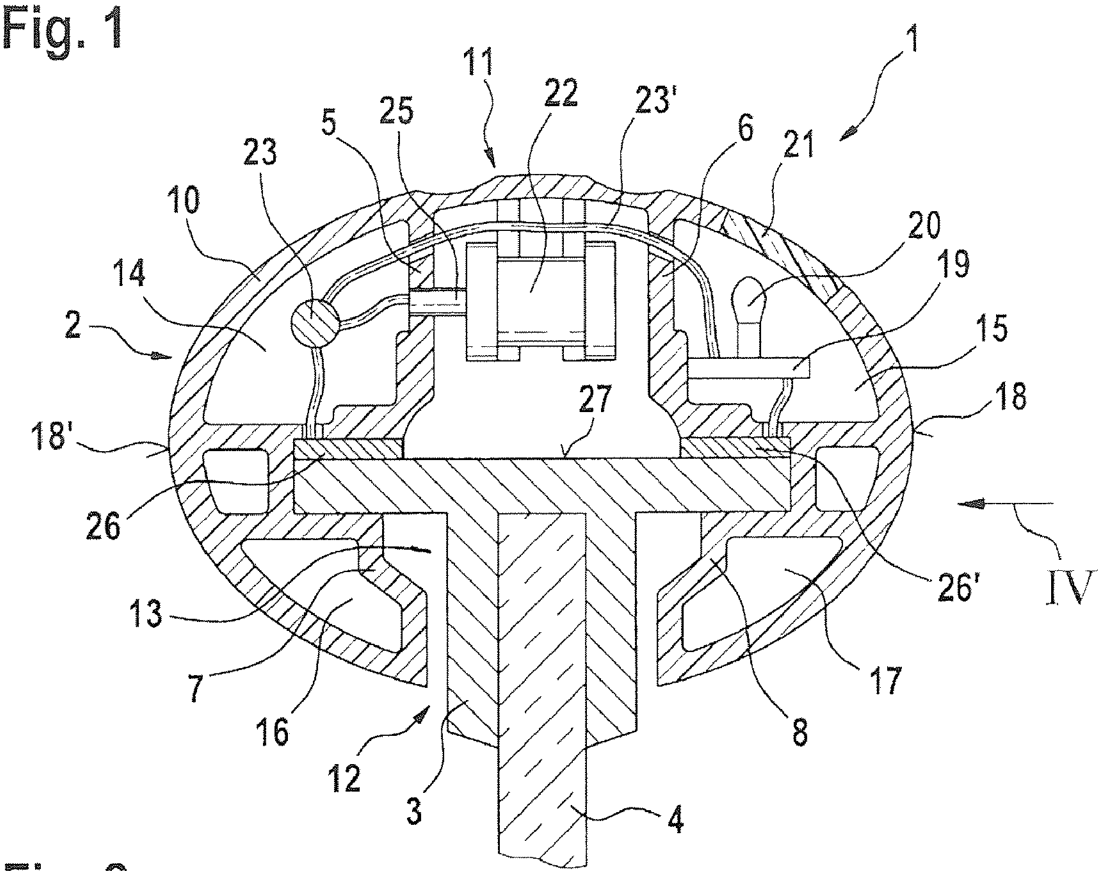

FIG. 1 shows a schematic sectional illustration of a handrail 1 in correspondence with a first exemplifying embodiment of the invention. The handrail 1 comprises a plurality of grip elements 2 which are lined up or protrude into one another or engage in one another, wherein one of the grip elements 2 is shown in a sectional illustration in FIG. 1. The sectional illustration in that case shows a cross-section of the grip element 2 or grip segment 2 perpendicularly to a running direction of the handrail 1. The grip element 2 is guided by means of a handrail guide profile member 3. The handrail guide profile member 3 is connected with a balustrade 4, which can be formed from, for example, glass or wood or gypsum or steel or aluminium or brass. Support of the movable handrail 1 on the balustrade 4 is thereby provided. The handrail 1 serves especially for escalators or moving walkways, wherein the handrail guide profile member 3 can be provided in sections in the forward run. In particular, in a lower return run region for the handrail 1, the handrail guide profile member 3 can be interrupted and a different return running or different supporting can take place, for example by way of support rollers. The design of the handrail 1 from a plurality of grip elements 2 enables simple assembly and simple exchange of individual parts or segments or simple maintenance or inspection. The handrail 1 according to the invention is, however, suitable for other applications.

The grip element 2 has stiffening ribs 5, 6, 7, 8. In that case, even further stiffening ribs can be provided, wherein in FIG. 1 for simplification of the illustration only the stiffening ribs 5, 6, 7, 8 are characterised. The stiffening ribs 5, 6, 7, 8 form suitable mounts for the handrail guide profile member 3. Moreover, the stiffening ribs 5, 6, 7, 8 are surrounded by an outer shell 10 or cover layer 10 or casing 10 and are connected therewith. The outer shell 10 or cover layer 10 or casing 10 is formed to be substantially closed, particularly in a grip region 11. The outer shell 10 or cover layer 10 or casing 10 has, in a lower region, an opening 12 for the handrail guide profile member 3. The stiffening ribs 5, 6, 7, 8, which subdivide the interior space 13, are provided in an interior space 13 of the grip element 2, which is bounded by the outer shell 10 or cover layer 10 or casing 10. Chambers 14, 15, 16, 17 are formed by this subdivision.

The handrail 1 is preferably so mounted or assembled that a user looks at the handrail 1 from the viewing direction denoted by IV when he or she uses the escalator or moving walkway. Provided in the chamber 15 on the side 18 of the grip element 2 facing the user is a lighting means mount 19 in which a lighting means 20 is mounted. In that case, a viewing window 21 can be provided preferably at the outer shell 10 or cover layer 10 or casing 10 in the region of the chamber 15. The outer shell 10 or cover layer 10 or casing 10 is formed to be transparent in the region of the chamber 15 and/or at least in the region of the lighting means 20 by virtue of the viewing window 21 which is possibly present. An entirely translucent outer shell 10 is, moreover, possible and enables a sensational form of illumination. The translucent outer shell 10 can be not only transparent, but also coloured. Furthermore, an apertured or perforated construction of the outer shell 10 is conceivable. In that case, the outer shell 10 is provided in the region of the lighting means 20 with small holes or round holes or four-cornered holes or square holes or rhombic holes or lozenge-shaped holes or rectangular holes or quadrilateral holes or semicircles or semi-ellipses or ellipses, which make possible an unobstructed issue of light.

Provided in the interior space 13 of the handrail 1 is a traction means which is formed as a chain 22 and in which the grip element 2 or grip segment 2 engages in suitable manner, for example by means of mounts or pins, which are connected with the outer shell 10 or cover layer 10 or casing 10.

Moreover, a cable 23 or a conductor rail 23 or a feed 23 or a supply 23, which comprises several electrical conductors, is arranged in the chamber 14 at a side 18' remote from the user. The cable 23 or a conductor rail 23 or a feed 23 or a supply 23 in that case extends through a plurality of identical chambers 14 of lined-up grip elements 2 or grip segments 2. At least a part of the electrical conductors of the cable 23 or the conductor rail 23 is connected by way of a connecting line 23' with the lighting means 20, so that several lighting means 20 of different grip elements 2 or grip segments 2 are connected together.

In addition, a traction means contact element 25 is provided, which on the one hand is fastened to the reinforcing rib 5 and on the other hand contacts or is contactingly connected with the chain 22. An electrical line of the cable 23 is electrically connected with the chain 22 or the belt 22 by way of the traction means contact means 25. The lighting means 20 is thus also electrically connected with the chain 22 or the belt 22. The traction means is thereby electrically conductive and the electrical energy is transported from there to where it is needed. Moreover, a feed or supply of electrical energy in the traction means, in the handrail return run, is conceivable. Handrail guide contact elements 26 and 26' are provided optionally or additionally. In that case the handrail guide contact element 26 is connected with the stiffening rib 5. Moreover, the handrail guide contact element 26 wipes an upper side 27 of the handrail guide profile member 3. Correspondingly, the handrail guide contact element 26' is connected with the stiffening rib 6 and similarly wipes an upper side 27 of the handrail guide profile member 3. The handrail guide profile member 3 consists of an electrically conductive material, for example of stainless steel or brass or copper or steel or aluminium. An electrical connection and/or current supply between a line of the cable 23 and the handrail guide profile member 3 exists by way of the handrail guide contact elements 26 and 26'. The lighting means 20 is also electrically connected with the handrail guide profile member 3 by way of the handrail guide contact element 26'. Consequently, through application of a current/voltage, current or electrical energy flows between the chain 22, or the belt 22, and the handrail guide profile member 3 to the lighting means 20 and it is supplied with electrical energy.

Moreover, it is also possible for the handrail guide profile member 3 to be provided with conductor rails which are insulated from one another. The insulation can be effected by, for example, a non-conductive handrail guide profile member 3 produced from plastics material. In this case, a voltage can also be applied between the handrail guide contact elements 26 and 26'. The current transfer by way of the traction element 22 or the chain 22 or the belt 22 can in this case be dispensed with.

Figure 2:
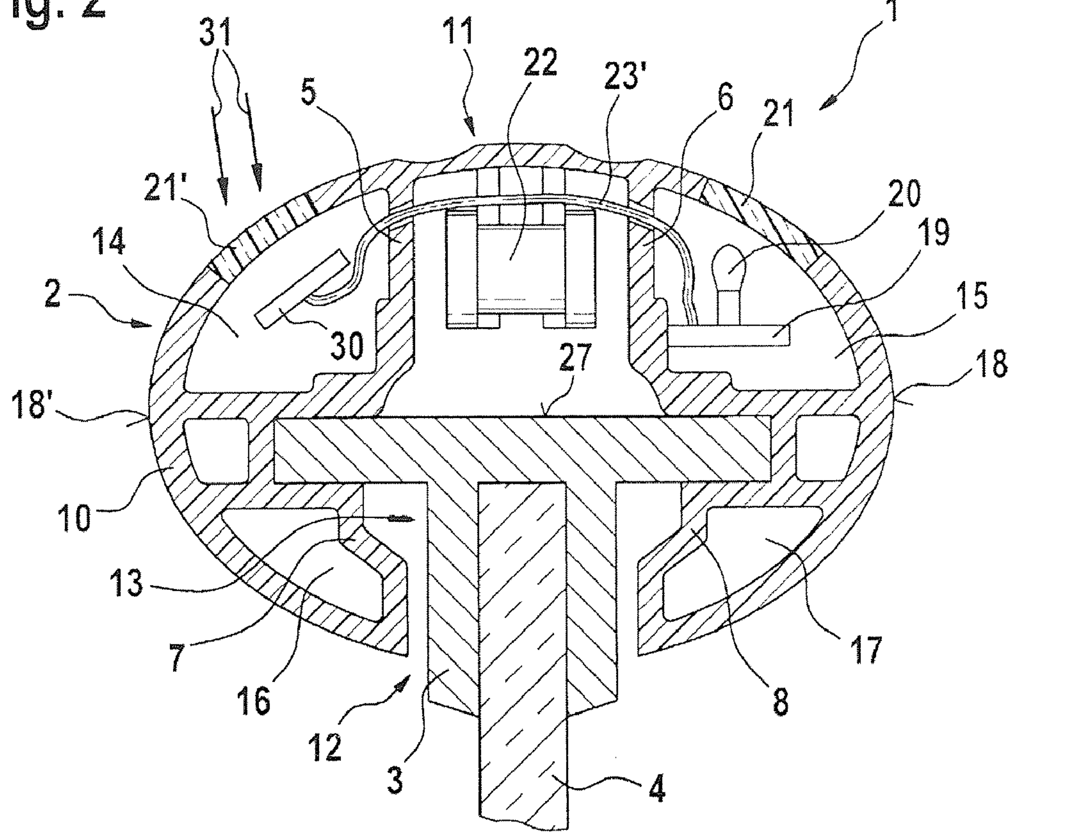

FIG. 2 shows a grip element 2 or grip segment 2 of a handrail 2 in a schematic sectional illustration in correspondence with a second exemplifying embodiment of the invention. In this exemplifying embodiment a solar element 30 formed as a photoelectric element is arranged in the chamber 14 lying at the side 18' remote from the user. The solar element 30 or solar cells 30 or photovoltaic cells 30 in that case lies or lie under a window element 21' which is formed as an entry window and which is inserted in a part, which consists of, for example, plastics material, of the outer shell 10 or cover layer 10 or casing 10 and is connected therewith by, for example, snapping in place or clipping in place or gluing. In addition, the outer shell 10 or cover layer 10 or casing 10 is formed to be transparent in the region of the solar element 30. The arrows 31 illustrate light impinging on the solar element 30 from the environment of the escalator or the moving walkway, for example daylight, reflected sunlight, or light produced by electric lamps. As a result of the incident light beams 31, electrical energy serving for operation of the lighting means 20 is generated by the solar element 30 or solar cells 30 or photovoltaic cells 30. For this purpose the solar element 30 is connected with the lighting means 20 by way of the connecting line 23'. Moreover, a cable 23, such as is illustrated in FIG. 1, can also be provided in order to distribute the electrical energy to several lighting means 20 of different grip elements 2 or grip segments 2. Moreover, several solar elements 30 or solar cells 30 or photovoltaic cells 30 of different grip elements 2 or grip segments 2 can also be connected together. This enables extension and distribution of a greater amount of energy for the lighting means 20. Moreover, it is thereby possible to provide compensation if the handrail 1 is exposed to sunlight or shone on only in part. The distribution of the electrical energy can also be carried out with the assistance of the traction means 22 and/or the handrail guide profile member 3, as is similarly described in corresponding manner on the basis of FIG. 1.

Figure 3:
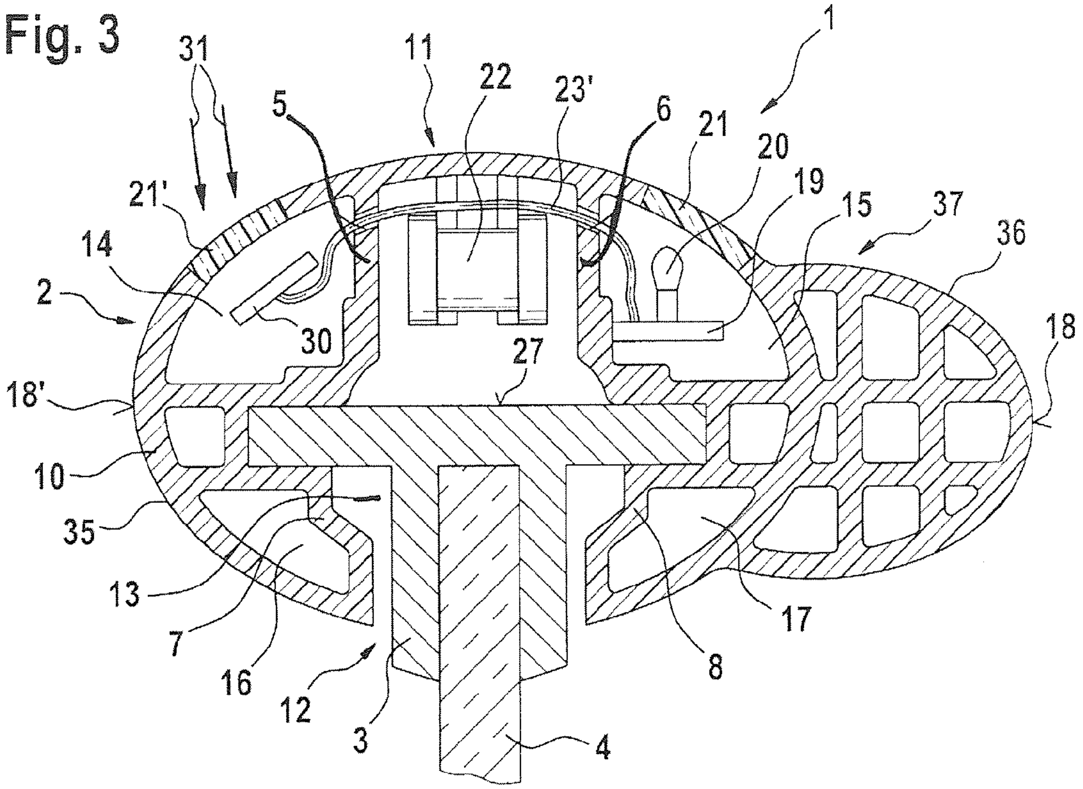

FIG. 3 shows a grip element 2 or grip segment 2 of a handrail 1 in a sectional illustration corresponding with a third exemplifying embodiment of the invention. In this exemplifying embodiment the outer shell 10 or cover layer 10 or casing 10 has a cross-section which is composed of a large oval or elliptical contour 35 and a small oval or elliptical contour 36. In that case, the small oval or elliptical contour 36 is cut at the side 18, which faces a user, by the large oval or elliptical contour 35. The window element 21 formed as a viewing window 21 is provided in a region 37 of the cutting between the oval or elliptical contours 35 and 36. In that case, the viewing window 21 can be provided only the region of the large oval or elliptical contour 35 or only in the region of the small oval or elliptical contour 36 or also in the region of both oval or elliptical contours 35 and 36. In this exemplifying embodiment the window element 21, which serves as viewing window 21, is provided at the large oval or elliptical contour 35. The lighting means 21 is, in this exemplifying embodiment, arranged in the chamber 15 in the region of the large oval or elliptical contour 35. The possibilities of gripping when holding the handrail 1 are increased by the small oval or elliptical contour 36. In particular, gripping from below is possible, whereby children and young people can securely hold the handrail 1.

Figure 4:
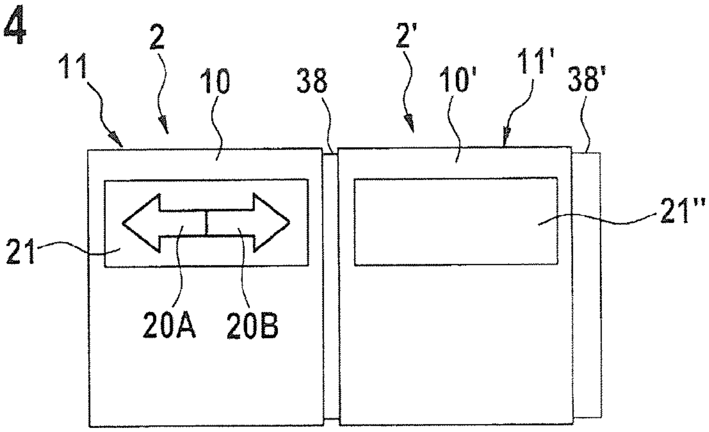

FIG. 4 shows grip elements 2 and 2' of a handrail 1 from the viewing direction, which is denoted in FIG. 1 by IV, in correspondence with a further exemplifying embodiment of the invention. The grip elements 2 and 2' or grip segments 2 and 2' have outer shells 10 and 10' or cover layers 10 and 10' or casings 10 and 10'. In that case, encircling introduction chamfers 38 and 38' or bevels 38 and 38' or recesses 38 and 38' are provided at the outer shells 10 and 10' or cover layers 10 and 10' or casings 10 and 10' and facilitate or enable assembly of the handrail 1 from a plurality of grip elements 2 and 2'. The outer shells 10 and 10' or cover layers 10 and 10' or casings 10 and 10' have window elements 21 and 21" designed as viewing windows 21 and 21". Lighting means 20A and 20B are arranged behind the window element 21. The lighting means 20A and 20B are designed in the form of, for example, travel direction arrows. In that regard, the directional arrows of the lighting means 20A and 20B point in opposite directions. In operation of the handrail 1 the lighting means 20A or 20B is activated, which indicates the instantaneous travel direction of the escalator or moving walkway, and thus follows the movement direction of the handrail 1. A visualisation of the instantaneous travel direction is thereby guaranteed. The travel direction indication is given and guaranteed clearly and simply and in cost-saving manner.

No lighting means is provided behind the window element 21", which is formed as a viewing window 21", in this exemplifying embodiment. However, the chamber 15 as is illustrated by way of example in FIG. 1, and in which the lighting means 20 is provided, is connected in the assembled state of the handrail 1 with a corresponding chamber of the grip element 2'. The generated light can thereby be perceived also indirectly via the viewing window 21". An indirect illumination is thereby imparted. An indirect or a direct illumination is also thus possible via the viewing window 21". In this connection, the stiffening rib 6 and in a given case the inner side of the outer shell 10 or cover layer 10 or casing 10 can be additionally provided in the region of the chamber 15 of the grip element 2 with a reflective material, for example by coating or metallising or chroming or plating or painting. A corresponding design is also possible in the case of the further grip elements, particularly the grip elements according to the kind or type 2'.

Figure 5:
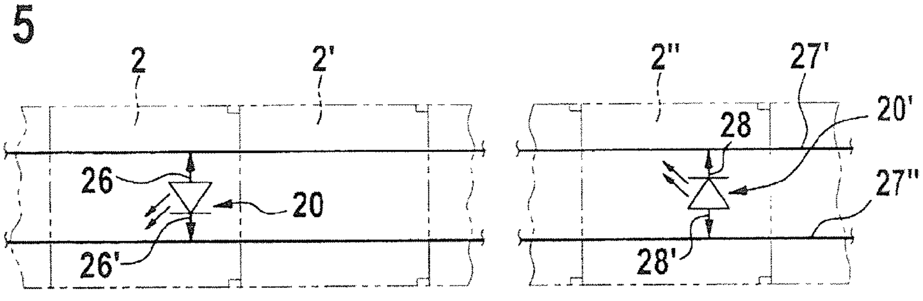

FIG. 5 shows a schematic circuit diagram, in the manner of a detail, for a handrail 1 in correspondence with a further exemplifying embodiment of the invention. In this exemplifying embodiment current lines 27' and 27" or conductor rails 27' and 27" are provided, which are arranged, for example, at the upper side 27 of the handrail guide profile member 3. The current lines 27' and 27" or conductor rails 27' and 27" are connected in contact-making manner or contacted by means of the handrail guide contact element 26 and 26' of the grip element 2. Moreover, handrail guide contact elements 28 and 28' of the grip element 2" are also provided for electrical contact-making or contacting of the current lines 27' and 27" or conductor rails 27' and 27". A spacing does not necessarily have to be present between the grip elements 2 and 2". The grip elements 2 and 2" can be inserted several times one behind the other and thus illuminate the complete handrail. Moreover, several grip elements 2' designed in correspondence with the grip element 2', which is illustrated in FIG. 4, without lighting means are also additionally possible between the grip elements 2 and 2". The grip elements 2 and 2" have lighting means 20 and 20'. In that case it is conceivable to connect the lighting means 20 and 20' with different polarity. As a result, either the lighting means 20 or the lighting means 20' can be operated. In this manner the lighting means 20 and 20' can be subdivided into different groups. Correspondingly, an alternative activation of the lighting means is also possible. If three or more electrical lines are provided, a separate or alternating or intermittent or specific connection of several lighting means is also conceivable. As a result, for example, the lighting means can reveal a selective illumination. For example, running light or rapid flashing light or partial light or chain light or a strip light.

Moreover, a solar element 30 can have one or more solar cells. In addition, the lighting means 20 can be of different design. For preference, light-emitting diodes or organic light-emitting diodes which can be operated at low voltage are provided. The operating safety can thereby be guaranteed even without expensive insulation. The traction means contact element 25 and/or the handrail guide contact elements 26 and 26' can be formed by wiper elements, conductive rollers or the like. In that case a design with a degree of elasticity or spring-loading or resilience is of advantage in order to guarantee a reliable electrical contact over the service life. The handrail 1 can be composed of various, divergent or differently designed grip elements 2 such as illustrated by way of FIG. 4 and FIG. 5. In that case the modular construction of the handrail 1 enables economic adaptation to different requirements or customer needs. In this regard, a combination of the energy supply by means of a solar element 30 and an external current supply can also be effected.

The window elements 21 and 21' and 21" can be formed from acrylic glass or ABS or PMMA or Plexiglas or PET or Lucite or Makrolon or Lexan or polycarbonate. A colouring and/or partial mirroring and/or mirroring is also then possible. The outer shell 10 or cover layer 10 or casing 10 can also be formed from a transparent plastics material or the like.

The outer shell 10 of the handrail 1 can be completely transparent.

A part of the grip elements preferably does not have any lighting means or, in the case of a few grip elements, no lighting means is introduced or embedded.

Reference is expressly made to a capability of possible combining of the teaching of this application with the teaching of an application filed at the same time by the same applicant. There, a handrail with material characteristics and safety characteristics improved still further or to greater extent or more or multiply improved is disclosed.

The invention is not restricted to the described embodiments.

The invention claimed is:

1. A handrail, comprising a plurality of aligned individual rigid grip elements, at least one of the grip elements having an outer shell, an individual lighting means arranged in an interior space bounded by the outer shell, and at least one window element associated with the lighting means, the window element being located laterally at the outer shell.

2. A handrail according to claim 1, wherein the outer shell has a cross-sectional profile which at least in a grip region is composed of a small oval or elliptical contour intersecting a large oval or elliptical contour, the window element is located at least one of the large and small contours in a region of the intersection.

3. A handrail according to claim 1, wherein the window element is formed from at least one of a group consisting of acrylic glass, ABS, PMMA, PET, and polycarbonate.

4. A handrail according to claim 1, wherein at least one solar power element is electrically connected with the lighting means and is located in the interior space.

5. A handrail according to claim 1, further comprising at least one traction means contact element is electrically connected with the lighting means and provides for electrical contact-making with the at least one traction means.

6. A handrail according to claim 1, wherein the at least one of the grip elements further comprises at least one handrail guide contact element electrically connected with the lighting means and provides electric contact-making with a handrail guide profile member or a conductor rail connected with a handrail guide profile member of the at least one of the grip elements.

7. A handrail according to claim 6, wherein the at least one of the grip elements has a further handrail guide contact element electrically connected with the lighting means and provides electrical contact-making with a further conductor rail that is insulated from the handrail guide profile member or the conductor rail electrically connected with the least one handrail guide contact element.

8. A handrail according to claim 1, wherein the handrail has at least one electrical conductor which connects the lighting means of a first of the least one of the grip elements with at least one lighting means of a second of the least one grip elements.

9. A handrail according to claim 8, wherein the at least one electrical conductor is part of an electrical cable extending through a channel which is formed by mutually adjoining interior spaces or chambers of mutually adjoining interior plurality of aligned grip elements.

10. A handrail according to claim 9, wherein the interior space or chamber of the interior space of a first grip element is connected to at least one interior space or chamber of an interior space of another of the at least one of the grip elements having an at least partly transparent outer shell.

11. A handrail according to claim 1, wherein the at least one of the grip elements are at least two in number, and one of the at least two of the grip elements has a lighting means which can be activated at least in part differently from the lighting means of another of the at least two grip elements.

12. A handrail according to claim 1, wherein the at least one of the grip elements are at least two in number, and the lighting means of a first of the at least two grip elements is connected a with reverse polarity with respect to the lighting means of a second of the at least two grip elements.

13. A handrail according to claim 1, wherein the interior space has a further lighting means which can be activated at least in part differently from the lighting means of the interior space.

14. A handrail according to claim 1, wherein at least one of the lighting means is formed as one of the group consisting of a travel direction arrow, a travel direction display, and a travel direction indicator.

15. A handrail according to claim 1, wherein the outer shell is at least partly of a self-extinguishing, fire-retardant or fireproof material.

* * * * *